United States Patent [19]

Burba et al.

[11] 4,435,558
[45] Mar. 6, 1984

[54] HARDENABLE URETHANE-EPOXY RESIN MIXTURES

[75] Inventors: Christian Burba; Hermann-Josef Lucas, both of Ascheberg-Herbern; Bernd Neffgen, Cappenberg, all of Fed. Rep. of Germany

[73] Assignee: Schering AG, Berlin and Bergkamen, Fed. Rep. of Germany

[21] Appl. No.: 450,015

[22] Filed: Dec. 15, 1982

[30] Foreign Application Priority Data

Dec. 28, 1981 [DE] Fed. Rep. of Germany ....... 3151592

[51] Int. Cl.$^3$ ............................................. C08G 18/80
[52] U.S. Cl. ..................... 528/45; 528/121; 528/122
[58] Field of Search .......................... 528/45, 121, 122

[56] References Cited

U.S. PATENT DOCUMENTS 3,993,708 11/1976 Brinkmann et al. ............. 260/830 P
4,137,276 1/1979 Sirota ............................. 260/830 P
4,328,330 5/1982 Wellner et al. ........................ 528/45

FOREIGN PATENT DOCUMENTS 39834 4/1981 European Pat. Off. .
2338256 2/1974 Fed. Rep. of Germany .
2152606 9/1979 Fed. Rep. of Germany .
2418041 7/1981 Fed. Rep. of Germany .
1399257 7/1975 United Kingdom .
1411485 10/1975 United Kingdom .

Primary Examiner—Maurice J. Welsh
Attorney, Agent, or Firm—Curtis, Morris & Safford

[57] ABSTRACT

The method of hardening a glycidyl compound with a polyether urethane urea amino hardener is disclosed, said hardener being prepared by reacting (1) a blocked prepolymer prepared by reacting a phenolic compound with the reaction product of a polyether polyol with an excess of polyisocyanate, with (2) a polyfunctional amino compound.

12 Claims, No Drawings

HARDENABLE URETHANE-EPOXY RESIN MIXTURES

The present invention pertains to hardenable, i.e. curable, synthetic resin mixtures comprising (1) a glycidyl compound having an average of more than one epoxy group per molecule and (2) the reaction product formed between prepolymeric aryl esters of carbamic acid and di- or poly-functional amino compounds having two or more active hydrogen atoms per molecule.

Synthetic resins comprising epoxy resins cured with polyamines are distinguished in practice by a number of desirable properties, such as good adhesion to organic and inorganic substrates, good solvent stability, and high resistance to the action of chemicals. Because of their high crosslinking density, amine cured epoxy resins, and especially those comprising diphenylpropane and epichlorohydrin, are hard and brittle, with glass transition temperatures above 20° C.

However, these synthetic resins fall short of meeting actual requirements in all field of use where impact strength and shock resistance as well as flexibility are required. This is true especially of the construction field, where shrinkage cracks in concrete, for example, must be permanently filled.

To some extent, an internal increase in flexibility can be obtained by reducing the crosslinking density, and an external increase in flexibility by the addition of plasticizers.

External elasticizers such as tar, phthalate esters, high-boiling alcohols, vinyl polymers and the like are nonreactive and are not incorporated into the thermoset plastic network. They merely result in an expansion through the filling out of space.

Internal elasticization can be secured by reducing the functionality of the curing agent.

Although the long chain amino amides of low functionality comprising dimerized fatty acids, which have been in use for a long time and on a large scale, do offer a satisfactory combination of properties as flexible curing agents for epoxy resins, they cannot be used as desired in some areas.

German patent application DE-AS 21 52 606 describes curable synthetic resin mixtures consisting of (a) certain glycidyl ethers and (b) certain phenyl esters of carbamic acid formed from prepolymeric isocyanates and alkyl phenols, and (c) polyamines or polyamino amides. However, because of the high viscosities of their components, mixtures of carbamic acid phenyl esters and epoxy resins have a final viscosity that is too high for practical use. The preparation of a mixture ready for use therefore requires the addition of a diluent. Another problem is that because of the widely differing equivalent weights of the resin and curing agent components, relatively high proportions of resin (epoxy plus polyurethane) must be mixed with relatively small proportions of curing agent, so that homogenization is far from simple and requires great care, also because of poor miscibility due to the difference in the viscosity of the resin and curing agent components.

According to German patent application DE-OS 23 38 256, high molecular weight amine terminated polyether urethane ureas are prepared by the reaction of prepolymers containing free isocyanate groups with polyamines in strongly diluted solutions and are then cured with epoxy resins. Although the use of solvents, and especially of aromatic solvents, is deleterious in practice and undesirable for both health and technical reasons, it is essential in this process because gelling would otherwise occur. On the other hand, the viscosity of the solventless reaction products selectively obtained according to German patent application DE-OS 23 38 256 is far too high for actual use.

German patent application DE-AS 2 418 041 describes a process for the production of elasticized molded parts and sheetlike articles in which certain epoxy compounds are reacted with amino compounds obtained by the hydrolysis of certain prepolymeric ketimines or enamines. This process permits the production of durable thermoset resin (duromers) which are resistant to chemicals and have improved properties. However, during the hydrolysis of these compounds, ketones or aldehydes are liberated and must be removed.

Moreover, still further improvement of the flexibility of the cured products is desirable.

The object of the present invention is to overcome these drawbacks and to provide curable synthetic resin mixtures which give coatings that have chemical resistance and good adhesion, adhesives, sheetlike articles, sealing and caulking compounds, and molded articles possessing high impact strength and shock resistance as well as improved flexibility.

In accordance with the invention, this object is accomplished by a method of hardening a glycidyl compound having an average of more than one epoxy group per molecule with an approximately stoichiometric amount of an amine hardener, wherein said amine hardener is a polyether urethane urea amine having two or more reactive amino hydrogen atoms per molecule.

The polyether urethane urea amine, prepared by the reaction of
  (1) a polyfunctional (including difunctional) aryl carbamate ester with
  (2) at least one polyfunctional (including difunctional) amino compound having
    (a) at least two reactive amino hydrogen atoms per molecule or
    (b) at least one reactive amino hydrogen atom and at least one azomethine group per molecule, said urea amine then being liberated from the reaction product formed between (1) and (2) (b) by hydrolysis of the azomethine group
  is admixed with
a glycidyl compound having an average of more than one epoxy group per molecule, and, optionally,
  conventional fillers, pigments, accelerators, viscosity regulators, and other additives.

The polyfunctional amine compound used according to (A) (2) is prepared by the reaction of a polyfunctional masked aliphatic or cycloaliphatic isocyanate, preferably an isocyanate of an optionally substituted aliphatic or cycloaliphatic hydrocarbon, with an excess of at least one polyfunctional amino compound having two or more active amino hydrogen atoms per molecule, and-/or with an amino compound having at least one reactive amino hydrogen atom and at least one azomethine group per molecule.

The compounds containing polyfunctional masked isocyanate groups which are used in this reaction may be products containing linear or branched reaction products containing hydroxyl or sulfhydryl groups and obtained by prior art processes by the reaction of polyalkylene polyether polyols and/or polyalkylene thioether polyols with polyisocyanates (including diisocyanates) in an NCO/OH (SH) ratio of from 1.5 to 2.5, followed by reaction of the terminal NCO group with the masking agents commonly used in this field.

Suitable linear or branched polyols having an average molecular weight ranging from 150 to 10,000, preferably from 400 to 5000, and more preferably of about 2000, are polyalkylene polyether polyols such as are obtained by the copolymerization, bulk copolymerization, or anionic polymerization of alkylene oxides, and in particular of ethylene oxide and propylene oxide, with di- or polyfunctional alcohols such as 1,2-ethanediol, 1,3-propanediol, 1,4-butanediol, and particularly alcohols with higher functionality, such as 1,1,1-trimethylolethane, 1,1,1-trimethylolpropane, glycerol, and 1,2,6-hexanetriol, or with amines such as ethylene diamine and 1,6-hexamethylene diamine as starting components, or they may be made by cationic polymerization and copolymerization of cyclic ethers such as tetrahydrofuran, ethylene oxide, and propylene oxide with acidic catalysts, or by polycondensation of polycondensable glycols such as 1,6-hexanediol in the presence of acidic etherification catalysts.

Suitable polyalkylene thioether polyols are primarily the polycondensation products of thiodiglycol with itself and with diols and/or polyols, for example, 1,6-hexanediol, triethylene glycol, 2,2-dimethyl-1,3-propanediol and 1,1,1-trimethylolpropane, in the presence of acidic etherification catalysts such as phosphoric acid and phosphorous acid.

A suitable polyacetal is the polycondensation product of formaldehyde and diols and/or polyols, for example diethylene glycol, triethylene glycol, 1,4-butanediol, 1,6-hexanediol, thiodiglycol, and 1,1,1-trimethylolpropane, with acidic catalysts such as phosphoric acid and para-toluene sulfonic acid.

Further suitable polyol components are the addition products of compounds containing reactive multiple bonds and polyhydroxyl and sulfhydryl components such as polyisobutylenediol and polyisoprenediol as well as the corresponding compounds containing terminal SH groups. (See U.S. Pat. No. 3,984,370).

These hydroxyl or sulfhydryl components are conventionally reacted with a polyfunctional isocyanate in an NCO/OH ratio ranging from 1.5 to 2.5, and preferably from 1.8 to 2.2, to give the corresponding prepolymeric compounds having terminal NCO groups.

Suitable aliphatic and cycloaliphatic polyisocyanates include 1,6-hexamethylene diisocyanate, isophorone diisocyanate, xylylene diisocyanate. 2,4,4,(2,2,4)-trimethyl-1,6-diisocyanathohexane, 1-methyl-2,4(2,6)-diisocyanatocyclohexane, methylenebis(4-cyclohexylisocyanate), and the isocyanate prepared by conventional methods from dimeric fatty diamine.

The terminal NCO groups of the polyfunctional prepolymeric compounds are then reacted with the masking agents commonly used in this field in at least stoichiometric amounts at temperatures ranging from 50° to 120° C., optionally by the use of catalysts.

In accordance with the invention, preferred masking agents are phenols and alkylphenols, wherein the by alkyl substituent has from 1 to 18 carbon atoms, for example, butylphenols, tetramethylbutylphenols, amylphenols, hexylphenols, heptylphenols, and especially 4-butylphenol mixtures of 4-nonylphenol isomers.

Suitable polyfunctional amino compounds to be used in the further reaction are diprimary, disecondary, and primary/secondary aliphatic, cycloaliphatic, heterocyclic, and araliphatic amines as well as their condensation products with carboxylic acids (polyaminoamides).

These amines, which may be substituted and which have at least two active amino hydrogen atoms per molecule, are reacted in a ratio of amine group to masked NCO group ranging from 1.5 to 2.5, and preferably from 1.8 to 2.2, at temperatures ranging from 40° to 100° C., and preferably from 60° to 80° C., with the component containing the aryl carbamate ester groups to give the corresponding prepolymeric amino compounds alone or in admixture.

It is also possible to use the amine component in larger amounts and to remove the excess on completion of the reaction, by distillation for example. The phenol component liberated during the reaction can remain in the reaction mixture.

In accordance with the invention, one or more of the following compounds are used as amino compounds:

(α) Amines of the formula $$R-NH-R^1-NH-R \quad (I),$$

wherein R is linear or branched alkyl having from 1 to 4 carbon atoms, or hydrogen, and $R^1$ is linear or branched aliphatic, cycloaliphatic, or araliphatic hydrocarbon, which may be substituted, having from 2 to 20 carbon atoms, and in particular 1,2-diaminopropane, or $R^1$ is the alkyl portion of a dimeric fatty diamine which may be interrupted by hetero atoms, and in particular oxygen atoms;

(β) an amine of the formula $$R^2-(R^3-NH-)_m-R^3-R^2 \quad (II),$$

wherein $R^2$ is $-N=C(R^4)(R'^4)$, $R^3$ is $-CH_2-CH_2-$ and/or $-CH_2-CH_2-CH_2-$, $R^4$ and $R'^4$ are the same or different and are $-CH_3$, $-CH_2-CH_3$, or $-C(CH_3)_3$, and m is 1 or 2;

(γ) an amine of the formula

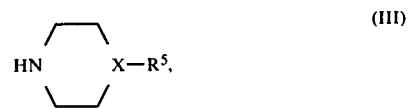

(III)

wherein $R^5$ is H, or wherein $R^5$ is $-(CH_2)_k-R^2$ and k is 2 or 3, or wherein $R^5$ is $(-CH_2)_h$

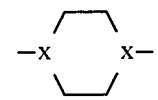

$(CH_2)_k-R^6$, and $R^6$ is $-NHR$ or $-R^2$, h is 0, 1, 2, or 3, and X is C or N; and/or (δ) condensation products of these amines with carboxylic acids wherein, when an amine of formula (II) is used with m being 1 and/or an amine of formula (III) is used with $R^6$ being $R^2$, the ratio of amine groups to carbamate aryl ester groups is 1:1, and wherein, when an amine of formulas (I) or (II) is used with m being 2, or an amine is used of formula (III) with $R^6$ being $-NHR$, the ratio of amino groups to carbamate aryl ester groups ranges from 1.8:1 to 2:1, and wherein the amino group is liberated by hydrolysis from the compounds containing the group $R^2$.

Examples of polyamines suitable for use in accordance with the invention are:

Ethylene diamine, diethylene triamine, 1,2-diaminopropane, 1,3-diaminopropane, 1,3-diaminobutane, 1,4-diaminobutane, 3-(n-isopropylamino)propylamine, hexapropyleneheptamine, 1-cyclohexylamino-3-aminopropane, 1,4-diaminocyclohexane, 1,3-diaminocyclohexane, 2,4-diaminocyclohexane, 1,3-di(aminocyclohexyl)-propane, N,N'-diethyl-1,3-diaminopropane, N,N'-diethyl-1,4-diaminocyclohexane, N-aminoethylpiperazine, N-aminopropylpiperazine, N-aminobutylpiperazine, 1,3-dipiperazinylpropane, 1,3-dipiperidylpropane, 3-(2-aminoethyl)-aminopropylamine, N,N'-bis-(3-aminopropyl)-ethylenediamine, a commercially available primary aliphatic polyoxypropylene diamine or triamine, phenylenediamine, 4,4'-diaminodiphenylmethane, and other diamines such as 1,7-diamino-4-oxaheptane, 1,7-diamino-3,5-dioxaheptane, 1,10-diamino-4,7-dioxadecane, 1,10-diamino-4,7-dioxa-5-methyldecane, 1,11-diamino-6-oxaundecane, 1,11-diamino-4,8-dioxanundecane, 1,11-diamino-4,8-dioxa-5-methyl-undecane, 1,11-diamino-4,8-dioxa-5,6-dimethyl-7-propionyl-undecane, 1,12-diamino-4,9-dioxadodecane, 1,13-diamino-4,10-dioxatridecane, 1,13-diamino-4,7,10-trioxa-5,8-dimethyltridecane, 1,14-diamino-4,11-dioxatetradecane, 1,14-diamino-4,7,10-trioxatetradecane, 1,16-diamino-4,7,10,13-tetrahexadecane 1,20-diamino-4,17-dioxaeicosane, and especially hexamethylenediamine, 2,2,4(2,4,4)-trimethylhexamethylenediamine and 3,3'dimethyl-4,4'-diaminodicyclohexylmethane, and particularly isophoronediamine (1-amino-3-aminomethyl-3,55-trimethyl-cyclohexane), N-aminoethylpiperazine, 1,2-diaminopropane, methylpentamethylenediamine, xylylenediamine, or mixtures of these amines.

The polyaminoamides also used in accordance with the invention are condensation products of dicarboxylic acids such as succinic acid, glutaric acid, adipic acid, pimelic acid, suberic acid, azelaic acid, sebacic acid, nonamethylenedicarboxylic acid, decamethylenedicarboxylic acid, and the dicarboxylic acids obtained by carbonylation of unsaturated fatty acids and excess amines, such as the compounds recited above.

Polyaminoamides, and polyaminoamides containing imidazoline groups and based on monocarboxylic acids such as acetic acid, propionic acid, butyric acid, valeric acid, caproic acid, caprylic acid, myristic acid, palmitic acid, oleic acid, linoleic acid, linolenic acid and the naturally occurring animal and vegetable fatty acids or their esters and the polyamines recited above, but especially polyalkylene polyamines such as diethylenetriamine, triethylenetetramine, and tetraethylenepentamine, may also be used, either alone or in mixture.

The amines which are preferred in accordance with the invention are polyaminoamides and polyaminoamides containing imidazoline groups comprising dimerized fatty acids and excess polyalkylene polyamines, which are used in the prior art as curing agents in the field of epoxy resins, or their mixtures with the amines recited above.

Along with the hardening or curing agents recited above, which in accordance with the invention are preferred, the amine curing agents for epoxy resins comonly employed in this field may be used for modification.

The epoxy resins or glycidyl compounds (B) which are also used in accordance with the invention are curable with these curing agents or with mixtures thereof when either hot or cold. They contain an average of more than one epoxy group in the molecule and are preferable glycidyl ethers of polyhydric alcohols, for example of glycerol or of neopentylglycol; of hydrogenated diphenylolpropane; or of polyhydric phenols for example of resorcinol; of diphenylolpropane; or of phenol-formaldehyde condensation products. The glycidyl esters of polyhydric carboxylic acids such as hexahydrophthalic acid or dimerized fatty acids may also be used. The epoxy values of these compounds are approximately between 0.2 and 0.7; preferably between about 0.4 and 0.7.

The use of liquid epoxy resins comprising epichlorohydrin and diphenylpropane having a molecular weight from 340 to 450 is particularly preferred.

Optionally, monofunctional epoxy compounds may be used to reduce the viscosity of the mixtures and thus to improve their processability. Examples of these are aliphatic and aromatic glycidyl ethers such as butylglycidyl ether and phenylglycidyl ether, or glycidyl esters such as glycidyl acrylate, or epoxides such as styrene oxide.

In the formulation of a reaction mass for coating, adhesive or casting applications, the usual mineral and organic fillers, pigments, plasticizers, accelerators, other solvents commonly employed in the epoxy-resin field, and still other additives may be used.

The curable mixtures in accordance with the invention are suitable for coatings, adhesives, sheetlike articles, caulking and sealing compounds, and molded articles in all fields of application where good adhesion, chemical resistance, high impact strength and shock resistance as well as improved flexibility and elasticity are required, as in the filling of cracks and joints in the construction field, for example.

A better understanding of the present invention and of its many advantages will be had from the following examples, given by way of illustration.

A. PREPARATION OF POLYETHER URETHANE CARBAMIC ACID ARYL ESTERS

Example 1

Preparation of a difunctional polyether having terminal carbamate (4-nonylphenyl ester) groups 1000 g of a linear polypropylene glycol of OH number 56.1 (MW=2000) were mixed with 222.3 g of isophoronediisocyanate. After the addition of 1.2 g of dibutyltin dilaurate, the mixture was heated to 75° C. with vigorous stirring and held at that temperature for 2.5 hours.

The reaction product had an isocyanate content of 3.4%.

0.3 g of zinc acetylacetonate and 215.7 g of a technical 4-nonylphenol mixture with branched nonyl radicals were added to the isocyanate prepolymer, cooled to 20° to 25° C. The mixture was then heated in two hours to 50° C. with stirring. The product then contained practically no isocyanate and had about 2.87% blocked NCO groups.

Example 2

Preparation of a trifunctional polyether having terminal carbamate (4-nonylphenyl ester) groups 1000 g of a branched trifunctional polypropylene glycol of OH number 35.6 (MW=4700) were mixed with 141 g of isophoronediisocyanate. After the addition of 1.2 g of dibutyltin dilaurate, the procedure of Example 1 was followed and a reaction product having an isocyanate content of 2.2% was obtained.

0.3 g zinc acetylacetonate and 131.1 g of a technical 4-nonylphenol mixture with branched nonly radicals were added to the isocyanate prepolymer, cooled to 20° to 25° C. The further procedure was as in Example 1, a product containing 1.95% blocked NCO groups and practically no isocyanate thus being obtained.

Example 3

Preparation of a carbamate (p-tert. butylphenol) ester

Example 1 was repeated with the difference that 147.1 g of p-tert.-butylphenol were used as the capping agent. The product then contained practically no isocyanate and had about 3% of blocked —NCO groups.

Example 4

Preparation of a prepolymer with a difunctional polyether and TMDI

A prepolymer was formed between a difunctional polyether and 2,4,4-(2,2,4)-trimethylhexamethylenediisocyanate (TMDI) by reacting 1,000 g of a linear polypropylene glycol having an OH number of 56.1 with 210 g of TMDI as in Example A(1). The reaction product has an isocyanate content of 3.47 percent.

Following Example A (1), the corresponding carbamic acid ester was prepared with 215.7 g of 4-nonylphenol. The product shows practically no unreacted isocyanate and has about 2.9 percent of blocked NCO groups.

Example 5

Preparation of a prepolymer of polytetrahydrofuran and IPDI 250 g of polytetrahydrofuran having a molecular weight of about 2,000 and an OH number of 55.5 were reacted according to Example A(1) with 54.95 g of isophorone diisocyanate (IPDI). The reaction product has an isocyanate number of 38.8.

300 g of this reaction product were reacted for 2 hours at 50° C. with 45.6 g of a technical 4-nonylphenol isomer mixture. Thereafter, the product contained practically no free isocyanate and contains about 2.52 percent of blocked NCO groups.

Example 6

Preparation of a prepolymer of a linear polyglycol and IPD 1,000 g of a linear polyglycol, prepared by the copolymerization of propylene glycol with propylene oxide and ethylene oxide and having a molecular weight of about 2,000 and a OH number of 55, were reacted with 22.3 g of isophorone diisocyanate. After the addition of 1.2 g of dibutyltin dilaurate, the mixture was warmed to 75° C. with vigorous stirring and maintained at this temperature for 2.5 hours. The reaction product has an isocyanate content of 3.4 percent.

0.3 g of zinc acetylacetonate and 215.7 g of a technical 4-nonylphenol isomer mixture having branched nonyl groups were added to the isocyanate prepolymer after cooling the latter to 20°-25° C. Subsequently, the mixture was stirred for 2 hours at 50° C. The product thereafter contained practically no isocyanate and contained about 2.87 percent of blocked NCO groups.

Example 7

Preparation of a prepolymer of polypropylene glycol and XDI 1,000 g of a linear polypropylene glycol having a OH number of 56.1 were reacted with 188 g of xylylene diisocyanate (XDI) as in Example A(1). The reaction product has an isocyanate content of 3.53 percent.

By reaction with 215.7 g of 4-nonylphenol, the corresponding carbamic acid ester was prepared. The product shows practically no isocyanate and contains about 2.98 percent of blocked NCO groups.

B. PREPARATION OF POLYETHER URETHANE UREA AMINES

Example 1

25.3 g of 1,2-diaminopropane were heated to 70° C. and 250 g of the product obtained under A, Example 1, were added through a dropping funnel over a period of 6 hours, the temperature being maintained at 70° C. Excess 1,2-diaminopropane was then drawn off at 70° C. under a vacuum of 0.1 mm Hg. The reaction product had an amino group content corresponding to 35 mg KOH/g (theoretically 36.5).

Example 2

59.5 g of 1,2-diaminopropane were mixed with 1176 g of the product obtained under A, Example 1, and the mixture was heated to 80° C. with vigorous stirring and held at that temperature for 3.5 hours.

The reaction product had an amino group content corresponding to 34.7 mg KOH/g.

Example 3

26.9 g of the trimethylhexamethylenediamine (TMD) were reacted with 250 g of the product obtained under A, Example 1, as in Example 2. The reaction product had an amino group content corresponding to 38 mg KOH/g.

Example 4

23.2 g of m-xylylenediamine (XDA) were reacted with 250 g of the product obtained under A, Example 1, as in Example 2. The reaction product had an amino group content corresponding to 39 mg KOH/g.

Example 5

29 g of isophoronediamine (IPD) were reacted with 250 g of the product obtained under A, Example 1, as in Example 2. The reaction product had an amino group content corresponding to 39 mg KOH/g.

Example 6

33.7 g of p,p'-diaminodiphenylmethane (MDA) were mixed with 250 g of the product obtained under A, Example 1, and the mixture was heated to 100° C. with vigorous stirring and held at that temperature for 16 hours. The reaction product had an amino group corresponding to 37 mg KOH/g.

Example 7

23.4 g of 1,2-diaminopropane were reacted with 340 g of the product obtained under A, Example 2, as in Example 1. The reaction product had an amino group content corresponding to 22 mg KOH/g.

Example 8

7.19 g of piperazine were reacted with 180 g of the product obtained under A, Example 2, as in Example 2. The reaction product had an amino group content corresponding to 26 mg KOH/g.

Example 9

30 g of 1,2-diaminopropane were reacted according to Example B(1) with 250 g of the product prepared above according to A(4).

The reaction product has a content of amino groups corresponding to 37.0 mg KOH/g (theory=37.3).

Example 10

35 g of 1,2-diaminopropane were reacted according to B(1) with 250 g of the product prepared under A(7).

The reaction product has a content of amino groups corresponding to 38.0 mg of KOH/g (theory=37.9).

Example 11

345.6 g of the product prepared according to A(5) were reacted with 30.6 g of 1,2-diaminopropane according to Example B(1).

The reaction product has a content of amino groups corresponding with 26.9 mg KOH/g.

Example 12

293.4 g of the product prepared according to A(1) were reacted with 80 g of an aminoamide containing imidazoline groups, comprising fatty acid and triethylenetetramine and having an amine number of 420.

The reaction product has a content of amino groups corresponding with 58 mg of KOH/g.

C. PREPARATION OF ELASTICIZED EPOXY-RESIN MASSES

Example 1

85 parts by weight of an epoxy resin based on bisphenol A and epichlorohydrin and having an epoxy value of 0.53 and a viscosity of about 13 Pa.s at 25° C. were diluted with 15 parts by weight of a glycidyl ether based on $C_{12}$ to $C_{14}$ fatty alcohols and epichlorohydrin and having an epoxy value of about 0.35 and a viscosity of about 10 mPa.s at 25° C. The latter is a reagent and also functions as a diluent viscosity regulator.

420 parts by weight of a polyether urethane urea amine according to B, Example 1, as well as 28 parts by weight of 2,4,6-tris-(dimethylaminomethyl)phenol (DMP) and 1.6 parts by weight of 4-nonylphenol (NP) were added. The DMP functions as an accelerator. The NP is both a viscosity regulator and an accelerator.

This epoxy resin mass was cast into plates 4 mm thick and allowed to cure at 23° C. The increase in hardness was determined (Shore hardness in conformity with DIN 53505) and, after 7 days' curing at 23° C., also the tensile strength, the elongation (DIN 53455), and the crack propagation resistance (DIN 53505).

The fully cured mass was clear/transparent and nearly nontacky on the surface.

The following resins were prepared and tests thereon were conducted as described in Example 1. The measurements presented in the following Table are average values from three tests.

Example 2

100 parts by weight of the epoxy mixture of Example 1 were mixed with 372 parts by weight of the amine of B, Example 3, and with 16 parts by weight of DMP and 29 parts by weight of NP.

Example 3

100 parts by weight of the epoxy resin mixture of Example 1 were mixed with 359 parts by weight of the amine of B, Example 4, and with 24 parts of DMP and 28 parts of NP.

Example 4

80 parts by weight of an epoxy resin based on bisphenol A and bisphenol F in a weight ratio of 70:30 and epichlorohydrin of an epoxy value of 0.54 and a viscosity of 7 mPa.S at 25° C. were diluted with 20 parts by weight of dibutylphthalate (as a so-called "plasticizer") and then mixed with 300 parts by weight of the amine of Example B6, as well as with 20 parts of DMP and 32 parts of NP.

Example 5

85 parts by weight of the epoxy resin of Example 1 were diluted with 15 parts of the glycidyl ether formed from neopentyl glycol and epichlorohydrin, said ether having an epoxy value of 0.68 and a viscosity of 20 mPa.s at 25° C. This was then mixed with 356 parts by weight of the amine of B, Example 5, and with 24 parts of DMP and 29 parts of NP.

Example 6

100 parts by weight of the epoxy resin mixture of Example 1 were cured with 539 parts of the amine of B, Example 7, and with 43 parts of DMP and 63 parts of NP.

Example 7

100 parts by weight of the epoxy resin mixture of Example 5 were reacted with 1062 parts by weight of the amine of B, Example 8, and with 71 parts of DMP and 90 parts of NP.

Example 8

100 parts by weight of the epoxy resin of Example C(1) were combined with 272 parts by weight of the amine from Example B(1), 4.7 parts by weight of isophorone diamine, 18.3 parts by weight of DMP, and 11.4 parts by weight of NP. After dilution with 44 parts by weight of methylene chloride/i-propanol, (1/1), the mixture was homogenously combined with 110 parts by weight of calcite filler having an average particle size of approximately 20 microns.

Example 9

100 parts by weight of the epoxy resin mixture of Example C(1) were mixed with 155 parts by weight of the amine from Example B(1), 30.5 parts by weight of NP, and 7 parts by weight of DMP. 58 parts by weight of aminoamide imidazoline curing agent comprising a dimerized tall oil fatty acid and diethylene triamine (having an amine number about 280, an amine equivalent weight of about 170, and a viscosity of 25° C. of about 2800 mPa.s) were added thereto.

The mixture was diluted with 49 parts by weight of methylene chloride/i-propanol (1/1) and then filled with 90 parts by weight of calcite (around 20 microns average particle size) and 10 parts by weight of titanium dioxide-rutile.

EXAMPLE 10

100 parts by weight of a pigmented synthetic resin mass as in Example C(8) were combined with 1 part by weight of pyrogenic silicic acid subsequent to thixotroping.

COMPARATIVE EXAMPLE 100 parts by weight of the epoxy mixture of Example 1 were mixed with 400 parts by weight of an aryl carbamate ester according to A, Example 1. A mixture of 20 parts by weight of 1,2-diaminopropane, 28 parts of DMP and 1.6 parts NP was added to this as a curing-agent component.

The fully cured material had a milky opacity and was very tacky on the surface.

TABLE

| Example | Shore hardness A/D at 23° C. after | | | | | Tensile strength $N/mm^2$ | Elongation at break % | Crack propagation resistance N/mm |
|---|---|---|---|---|---|---|---|---|
| | 1 day | 2 days | 3 days | 7 days | 14 days | | | |
| 1 | 46/9 | 52/11 | 55/12 | 54/11 | 53/11 | 2.6 | 460 | 6.0 |
| 2 | 65/16 | 71/20 | 73/21 | 73/20 | 73/21 | 4.4 | 360 | 13.0 |
| 3 | 82/31 | 88/36 | — | 88/36 | 88/36 | 3.6 | 150 | 18.0 |
| 4 | 75/21 | 84/27 | — | 93/36 | 94/40 | 4.3 | 105 | 18.0 |
| 5 | 83/30 | 87/33 | 88/36 | 89/36 | 89/37 | 6.5 | 385 | 30.0 |
| 6 | 33/6 | 35/7 | 36/7 | 38/7 | — | 1.1 | 220 | 3.0 |
| 7 | nm/nm | 3/nm | 10/nm | 10/nm | — | 0.1 | 650 | 1.0 |
| 8 | 55/11 | 63/15 | — | 70/17 | 72/17 | 3.4 | 323 | 8.0 |
| 9 | 17/1 | 50/10 | 55/12 | 64/15 | 65/15 | 2.8 | 203 | 6.0 |
| 10 | 17/1 | 52/11 | 58/14 | 65/16 | 65/16 | 2.9 | 167 | 6.0 |
| Comp. Example | nm/nm | 20/2 | 42/7 | 42/7 | 41/7 | 1.1 | 240 | 5.0 | nm = not measurable

What is claimed is:

1. The method of hardening a glycidyl compound having more than one epoxy group per molecule, which method comprises admixing with said glycidyl compound an approximately stoichiometric amount of an amino hardener which is a polyether urethane urea amine prepared by the reaction of
   (1) a prepolymer having blocked isocyanate groups, prepared by reacting a phenol or alkylphenol with the reaction product of a polyether polyol or polythioether polyol with an excess of a polyisocyanate, with
   (2) a polyfunctional amino compound having
      (a) at least two reactive amino hydrogen atoms per molecule or
      (b) at least one reactive amino hydrogen atom and at least one azomethine group per molecule, the amine then being liberated from the reaction product formed between (1) and 2(b) by hydrolysis of the azomethine group.

2. The method as in claim 1 wherein said mixture additionally comprises at least one member selected from the group consisting of fillers, pigments, accelerators, viscosity regulators, and other additives.

3. the method as in claim 1 wherein said blocked prepolymer is the reaction product of
   (A) a polyalkylene polyether polyol having an average molecular weight between 150 to 10,000 with an excess of
   (B) a polyfunctional aliphatic or cycloaliphatic isocyanate, the ratio of NCO groups of OH groups being between 1.5 and 2.5, followed by further reaction of the resulting prepolymer containing NCO groups with
   (c) a phenol, the phenol/NCO ratio being between about 1.0 and about 1.5.

4. The method as in claim 3 wherein said polyol has an average molecular weight between 400 and 5000.

5. The method as in claim 3 wherein said polyol has an average molecular weight of about 2000.

6. The method as in claim 3 wherein said isocyanate is isophorone diisocyanate.

7. The method as in claim 3 wherein said phenol is a para-noylphenol or a para-butylphenol.

8. The method as in claim 1 wherein said polyfunctional amino compound is selected from the group consisting of
   (A) amines of the formuls

   R—NH—R$^1$—NH—R wherein R is linear or branched alkyl having from 1 to 4 carbon atoms, or is hydrogen, and R$^1$ is linear or branched aliphatic, cycloaliphatic, or araliphatic hydrocarbon, which may be substituted, having from 2 to 20 carbon atoms, or is the alkyl portion of a dimeric fatty diamine which may be interrupted by hetero atoms;
   (B) amines of the formula

   R$^2$—(R$^3$—NH—)$_m$—R$^3$—R$^2$, wherein R$^2$ is —N=C(R$^4$) (R'$^4$), R$^3$ is —CH$_2$—CH$_2$— or —CH$_2$—CH$_2$—CH$_2$—, R$^4$ and R'$^4$ are the same or different and are —CH$_3$, —CH$_2$CH$_3$, or —C(CH$_3$)$_3$, and m is 1 or 2;
   (C) amines of the formula

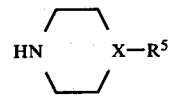

wherein R$^5$ is H, or wherein R$^5$ is —(CH$_2$)$_k$—R$^2$ and k is 2 or 3, or wherein R$^5$ is (—CH$_2$)$_h$

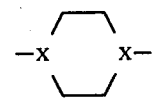

(CH$_2$)$_k$—R$^6$, R$^6$ is —NHR or —R$^2$, h is 0, 1, 2 or 3, and X is C or N;
   (D) condensation products of an amine (A)-(C) with a carboxylic acid wherein, when an amine (B) is used with m=1 or an amine (C) is used with $R^6=R^2$, the ratio of amino hydrogen atom to carbamate aryl ester groups is 1:1, and wherein, when an amine (A) or (B) is used with m=2, or an amine (C) is used with $R^6$=NHR, the ratio of amino hydrogen atoms to carbamate aryl ester groups is from 1.8:1 to 2:1, an amino group being liberated by hydrolysis from compounds containing a group $R^2$.

9. A method for making a polyether urethane urea amine having two or more reactive amino hydrogen atoms per molecule, which method comprises reacting
  (1) a prepolymer having blocked isocyanate groups, prepared by reacting a phenol or alkylphenol with the reaction product of a polyether polyol or polythioether polyol with an excess of a polyisocyanate, with
  (2) a polyfunctional amino compound having
    (a) at least two reactive amino hydrogen atoms per molecule or
    (b) at least one reactive amino hydrogen atom and at least one azomethine group per molecule, the amine then being liberated from the reaction product formed between (1) and 2(b) by hydrolysis of the azomethine group.

10. A method as in claim 9 wherein said amino compound is present in an excess such that the ratio of reactive amino hydrogen atoms to blocked isocyanate groups is from about 2:1 to about 4:1.

11. A method as in claim 9 wherein said amino compound is present in an excess such that the ratio of reactive amino hydrogen atoms to blocked isocyanate groups is about 2:1.

12. A polyether urethane urea amine made by the method of claim 9.

* * * * *